April 17, 1962  G. MOUNTJOY  3,029,893
AUTOMATIC VEHICLE CONTROL SYSTEM
Filed Aug. 25, 1958  2 Sheets-Sheet 1

INVENTOR.
Garrard Mountjoy
BY
D. R. Sadler
ATTORNEY

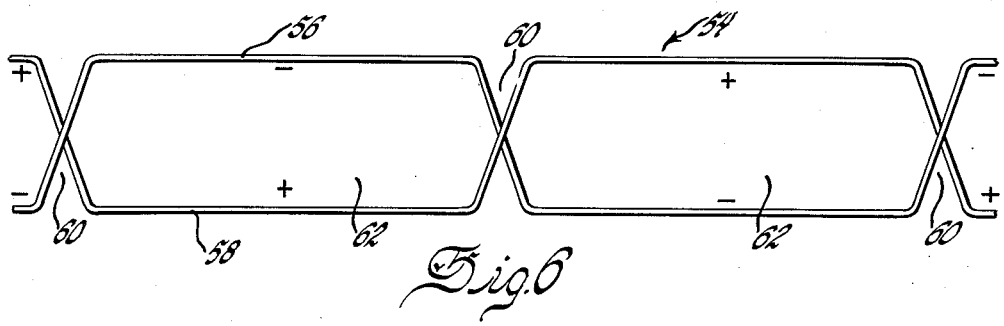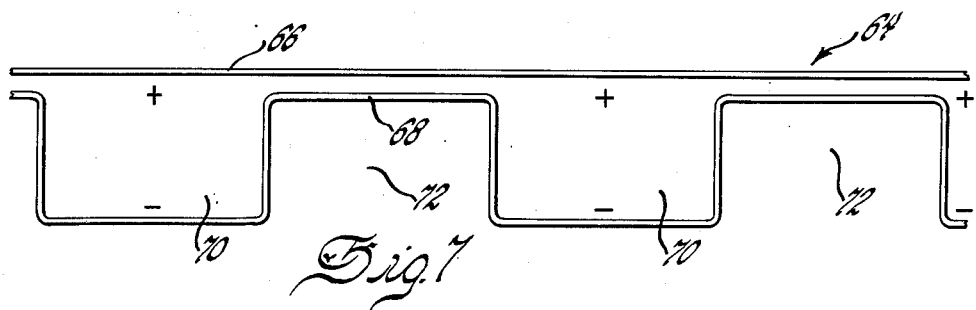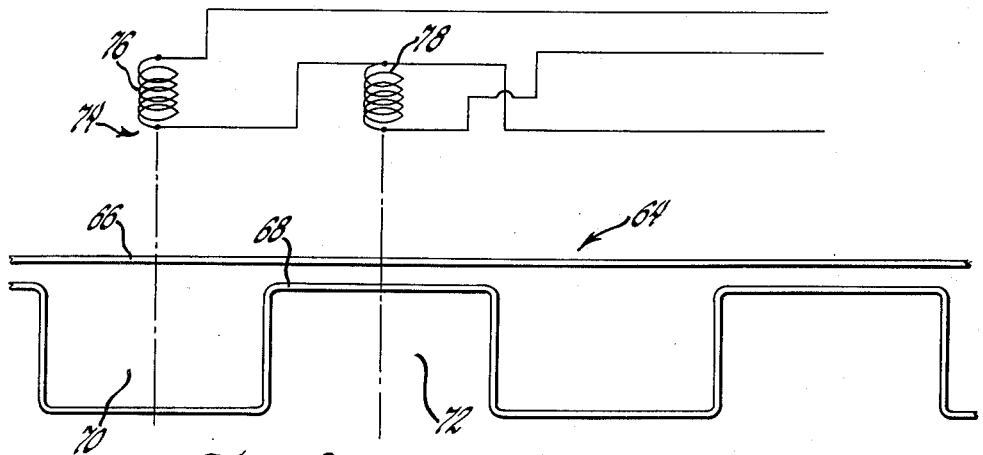

United States Patent Office 3,029,893
Patented Apr. 17, 1962

3,029,893
AUTOMATIC VEHICLE CONTROL SYSTEM
Garrard Mountjoy, Little Rock, Ark., assignor to General Motors Corporation, Detroit, Mich., a corporation of Delaware
Filed Aug. 25, 1958, Ser. No. 756,827
15 Claims. (Cl. 180—82.1)

The present invention relates to automotive vehicles and, more particularly, to a guidance system for automatically controlling the operation of such vehicles.

In the past numerous attempts have been made to devise a practical guidance system for automatically controlling the operation of automotive vehicles on a highway. In one form of guidance system a conductor is submerged below the surface of the roadway and a suitable pickup is provided on the vehicle for sensing the relative position of the conductor and actuating the vehicle steering system for maintaining the pickup over the conductor. However, in such systems the conductor has not been able to supply a guidance signal containing an adequate amount of information to insure the required degree of precision for controlling high speed vehicles. Due to the dynamic characteristics of high speed vehicles, the previous systems have been unable to steer the vehicles with sufficient accuracy and they have been unable to maintain the speed of all automatically controlled vehicles in a group at a predetermined amount. In addition, in the foregoing systems, in the event of changing road conditions such as rain and/or snow, it has been impossible to simultaneously modify, from a central control point, the operation of all the vehicles in the system. As a result, in the event a series of closely spaced automotive vehicles were to be controlled by the foregoing systems, it would be inevitable that one or more vehicles would interfere with each other. Accordingly, although some of the foregoing systems may be adequate for guiding some types of vehicles, they have not been acceptable for use in guiding high speed automotive vehicles along a roadway in close proximity to other similar vehicles which may be automatically or manually controlled.

It is now proposed to provide a vehicle guidance system in which the path of travel is defined by electrical conductors that are capable of producing a guidance signal that contains an adequate amount of information to insure a precision control of automotive vehicles. More particularly, this is to be accomplished by providing at least a pair of electrical conductors that are submerged below the surface of the roadway and are interconnected with an oscillator or generator that supplies the conductors with an alternating current. This current, in turn, creates an alternating electromagnetic field that extends above the surface of the roadway and provides a guidance signal for the vehicle to follow. The conductors are arranged in a predetermined pattern so that the electromagnetic field will consist of zones of periodically reversed polarity. Any vehicles to be controlled carry a pickup unit which includes one or more inductances or coils that are positioned to travel through the magnetic field generated above the surface of the road. Thus, whenever the pickup unit is disposed in the alternating electromagnetic field, an error signal will be induced therein even though the vehicle is not in motion or is traveling at a relatively low speed. The frequency of this signal will be equal to the frequency of the current in the conductors and the polarity or phase will be a function of the amount of displacement of the pickup therefrom. This signal is then fed into the steering control system for the vehicle to actuate the steering system for guiding the vehicle to maintain the pickup unit properly centered over the guidance conductors.

In addition, as the pickup unit passes from one zone to another the induced signal will vary due to the reversing polarity of the flux in the electromagnetic field. As a result, the signal induced in the pickup will be modulated at a frequency equal to the rate at which the pickup unit is passing from one zone to the next. Thus the signal will be modulated in response to the speed of the vehicle. By supplying the conductors with a speed signal having a command frequency, the vehicle will receive signals indicating the speed it is traveling and the speed it should be traveling. Accordingly, by providing means capable of comparing the frequencies and a throttle servo responsive to the difference, the speed of the vehicle can be accurately maintained at a predetermined amount. In the event of changing road conditions the command frequency in the conductors can be changed by adjusting the frequency at a central control point to simultaneously automatically reduce the speed of all vehicles being controlled by the guidance system.

In the drawings:

FIGURE 6 is a view of a modified arrangement of the electrical conductors.

FIGURE 7 is a view of a further modified arrangement of the electrical conductors.

FIGURE 8 is a view of the cable of FIGURE 7 and a modified pickup unit for scanning the electromagnetic field about the conductors.

Figure 1:
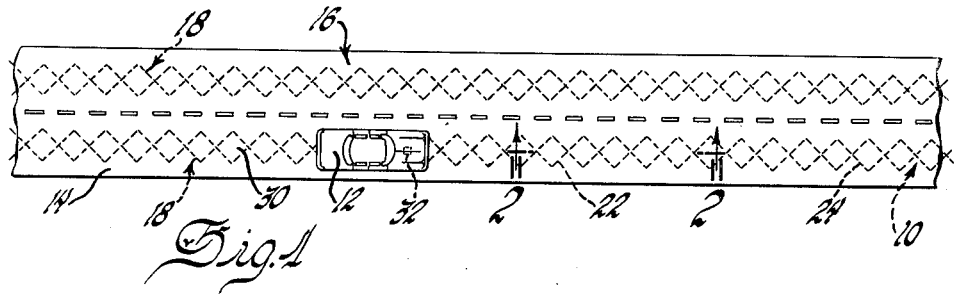
FIGURE 1 is a plan view of a highway and an automotive vehicle which embody the present invention.
Figure 2:
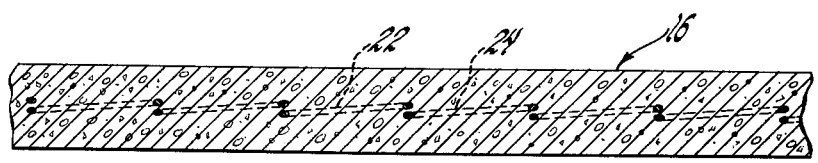
FIGURE 2 is a transverse view of a portion of the highway, taken substantially along the plane of line 2—2 of FIGURE 1.

Referring to the drawings in more detail, the present invention is adapted to be incorporated into a guidance system 10 for automatically controlling one or more vehicles 12 traveling along the lanes 14 of a roadway 16. The system 10 includes separate sets 18 of electrical conductors located in the centers of each of the lanes 14 which are to be automatically controlled and a control means 20 on each of the vehicles 12 for sensing the position of the vehicle 12 relative to the conductors.

The present sets 18 of guidance conductors are buried below the surface of the roadway 16 so as to be protected from the elements, etc. They are arranged to define the center line of the path which the automatically controlled vehicles 12 will follow and, accordingly, extends longitudinally of the lane. Although the sets 18 of conductors may be disposed in any portion of the lane 14, it is preferable that each set 18 be located as close as possible to the center of the lane 14.

In the first embodiment the set 18 consists of a pair of spaced electrical conductors or wires 22 and 24 which are adapted to carry an electrical current of sufficient magnitude to form an electromagnetic field above the surface of the roadway 16. The input ends 26 of the conductors are interconnected with the output of an oscillator or generator 28 that is adapted to supply the foregoing current. Although the frequency of this current is not critical, it is preferably sufficiently high to enable it to be easily separated from the speed signal as described in more detail below. It has been found that a frequency slightly above the audio range, for example 20 kc. to 50 kc., will permit the use of conventional audio equipment and will provide a very satisfactory signal source that will not cause interference with surrounding equipment such as radio receivers.

The two conductors 22 and 24 are periodically crossed to form loops 30 which are preferably flat and in a plane substantially parallel to the surface of the lane 14. Since the conductors are periodically crossed, the electromagnetic field about the entire set 18 will have zones corresponding to the loops 30 in the conductors 22 and 24 with the direction of the magnetic flux in each zone being reversed relative to the direction of the magnetic flux in the adjacent zones. It may thus be seen that the magnetic flux field radiated above the surface of the roadway 16 forms a guidance signal that will be alternating at a frequency equal to the frequency of the current in the conductors 22 and 24 and will consist of alternating zones of reversed polarity.

Any automotive vehicles 12 adapted to travel on the roadway 16 and be automatically controlled from the set 18 of conductors 22 and 24 are equipped with a suitable pickup unit 32 mounted on the vehicle to be disposed over the set of conductors. Thus as the vehicle 12 travels along the path, the pickup 32 will move longitudinally of the magnetic field set up by the current in the conductors. The pickup unit 32 preferably includes a pair of inductive coils 34 and 36 that are separated from each other so as to straddle the set 18 of conductors and be disposed on the opposite sides thereof. Thus these coils 34 and 36 will have voltages induced therein as a result of the alternating current in the conductors.

Figure 3:
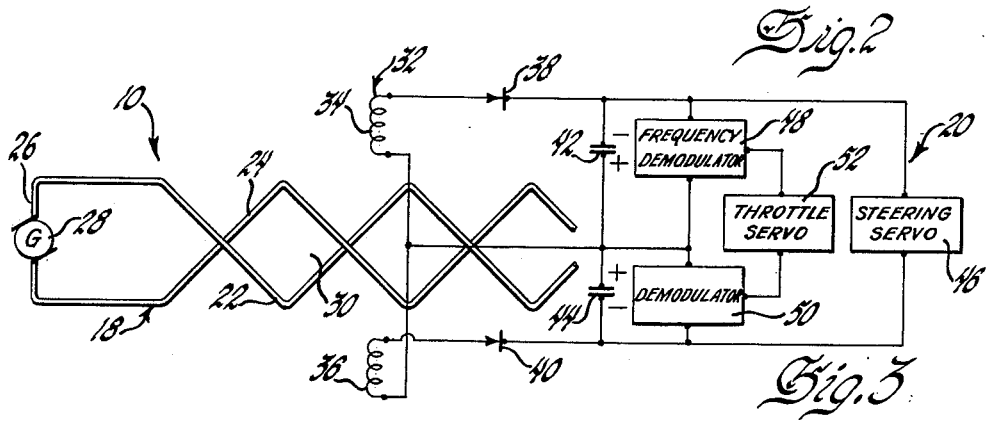
FIGURE 3 is a schematic diagram of a section of the electrical conductors and the controls in the vehicle.
Figure 5:
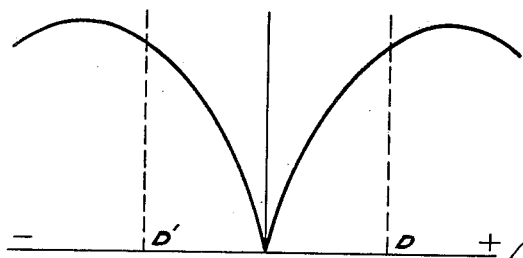
FIGURE 5 is a graph representing the sensitivity of the pickup unit in response to lateral displacement of the vehicle.

Each of the pickup coils 34 and 36 is serially connected to rectifiers 38 and 40 and condensers 42 and 44 so that the voltages induced in the coils 34 and 36 will cause the condensers 42 and 44 to acquire charges. Since the voltage induced in each coil 34 and 36 will be a function of the displacement of the coil from the conductors, the charge on each of the condensers will also be a function of the displacement of its associated coil from the conductors. By connecting the condensers 42 and 44 in series with the charges thereon being opposed as shown in FIGURE 3, the total voltage across both condensers 42 and 44 will be zero when the coils 34 and 36 are properly centered over the set 18 of conductors. However, in the event of a lateral displacement of the vehicle 12 and the pickup coils 34 and 36, one of the coils 34 or 36 will be closer to the conductors than the other coil and the voltage across one of the condensers 42 or 44 will increase while the voltage across the other condenser 42 or 44 will decrease. As a result, the total voltage across both condensers 42 or 44 will vary as shown in FIGURE 5. That is within a working range of say D to D', the total voltage will increase with displacement and the polarity of the voltage will correspond to the direction of the displacement. It should be noted that in the event of a slight lateral movement from the zero centered position, a drastic rise in the induced voltage can be obtained.

In order to steer the vehicle 12 along the predetermined path, a steering system is provided on the vehicle. The steering system may be manually controlled and it may also be controlled by a steering servo system 46 which is operatively interconnected with the condensers 42 and 44 and is responsive to the total voltage thereacross. In the event the total voltage is substantially zero, the steering servo 46 will retain the dirigible wheels in a straight ahead position. However, the servo system 46 will be effective to move the wheels to a predetermined position for any given amount of voltage in a direction corresponding to the polarity of the voltage. Thus, the amount of steering correction will be a function of the amount of displacement of the vehicle 12 from the path. It may therefore be seen that when the vehicle 12 is disposed to the right side of the path, a voltage will be applied to the steering servo 46 which will adjust the dirigible wheels so as to cause the vehicle 12 to turn towards the left, thereby redirecting the vehicle 12 towards the path. Conversely, if the vehicle 12 is to the left side of the path, the voltage will be of reversed polarity and will cause the vehicle to turn to the right so as to return the vehicle to the path. Accordingly, the vehicle will always be maintained on the path with the two coils 34 and 36 symmetrically disposed about the conductors 22 and 24.

Figure 4:
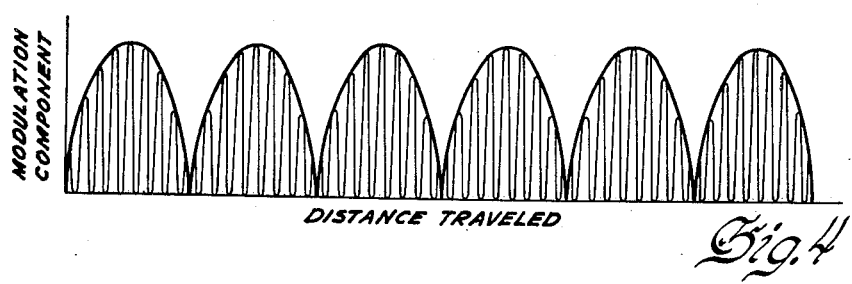
FIGURE 4 is a graph of the signal generated in the vehicle pickup as it travels along the conductors.

When the vehicle 12 is in motion, the pickups 34 and 36 will be traveling through the zones of alternating polarity so that the voltage induced therein will correspond to the number of flux lines being cut by the pickup coils 34 and 36. Due to the variations in the flux field, the induced voltage will be modulated similar to that shown in FIGURE 4. If desirable, the wires or conductors 22 and 24 may be arranged so that the flux density will vary in such a manner as to produce a sinusoidal variation in the amplitudes of the induced voltage. The rate of the fluctuations or modulating frequency will equal the rate at which the pickup 32 passes over the loops 30. Thus the induced voltages will be modulated by a frequency corresponding to this rate or, in other words, at a frequency corresponding to the speed of the vehicle 12. Accordingly, a demodulating circuit 48 may be interconnected across one or both of the pickup coils 34 or 36 or a separate additional coil so as to demodulate the induced voltages and produce an output corresponding in amplitude to the frequency of the modulations. This voltage will then be a signal accurately corresponding to the speed at which the vehicle 12 is traveling along the path defined by the set 18 of conductors 22 and 24.

Since it is essential that all of the vehicles 12 on the path travel at identical speeds, a command speed may be established at which the vehicles travel. Information as to this speed may be supplied to the set 18 of conductors 22 and 24, in any suitable manner. For example, the frequency of the current in the conductors 22 and 24 may be a function of the command speed, or, if desired, a separate and additional conductor may be provided that carries such a signal. In order to supply this information to the vehicle 12, a suitable demodulating circuit 50 may be interconnected with the output of one or both of the pickup coils 34 and 36 or a separate additional coil. This circuit 50 will demodulate the induced voltage and produce a voltage corresponding in amplitude to the frequency of the command current in the conductors. As a result, this voltage will represent the command speed at which the vehicle is supposed to travel.

In order to maintain the vehicle 12 at command speed, a throttle servo 52 may be interconnected with the demodulating circuit 50 and the demodulating circuit 48. This servo 52 is operatively interconnected with the engine throttle valve for regulating the speed of the vehicle 12 and is responsive to the difference between the outputs of the two demodulating circuits 48 and 50. Thus when the servo 52 adjusts the vehicle speed until the difference is zero, the speed of the vehicle will be equal to the command speed. In the event it is desirable to modify the command speed as a result of changing road conditions or for some other reason, the frequency of the generator or oscillator 28 may be varied from a central control point to thereby simultaneously change the speed of all of the vehicles.

As an alternative the conductors 56 and 58 may be arranged similar to FIGURE 6. In this embodiment the conductors 56 and 58 are maintained substantially parallel to each other except for the portions 60 where they cross. As a result, there will be a maximum area to the loop 62 and the flux density through which the pickup is traveling will remain substantially uniform except at the points of crossover. Thus the voltages induced in the pickups 34 and 36 will more closely approximate a square wave. The positive and negative signs indicated are instantaneous and demonstrate polarity differences between the zones. Of course, these signs continuously reverse with the alternations of the current.

As a further embodiment the arrangement of FIGURES 7 and 8 may be employed. In this arrangement one wire or conductor 66 is substantially straight while a second conductor 68 is looped to form zones 70 of maximum flux density and zones 72 of reduced flux density. The pickup unit 74 employed in the vehicle consists of a pair of coils 76 and 78 that are disposed on a line extending longitudinally of the vehicle 12 substantially parallel to the path defined by the conductors. The spacing between the two coils 76 and 78 corresponds to the length of one zone 70 or 72. Thus, when one coil 76 is disposed in a zone 70 of maximum flux density, the other coil 78 will be disposed in a zone 72 of minimum flux density. As a result, the total of the voltages induced in both of the coils 76 and 78 will be substantially constant. Thus the total signal induced in both coils will not be modulated by the speed at which the vehicle 12 is traveling and, accordingly, will be well suited for use in transferring information such as voice communications, command speed, etc. to the vehicle. At the same time it should be noted that the individual coils 76 and 78 will, in turn, have a voltage induced therein that is modulated in accordance with the vehicle 12 speed and may be utilized for controlling the speed of the vehicle 12 at command speed. In addition, the vehicle 12 may have a steering servo interconnected with the pickups 76 and 78 for guiding the vehicle 12 along the path defined by the cable 64.

It is to be understood that, although the invention has been described with specific reference to particular embodiments thereof, it is not to be so limited since changes and alterations therein may be made which are within the full intended scope of this invention as defined by the appended claims.

What is claimed is:

1. A signal source for controlling a vehicle traveling a predetermined path, said source comprising at least a pair of electrical conductors that are spaced from each other and arranged to define said path, a source of alternating current of a variable frequency in a predetermined frequency range connected to the input ends of said conductors to supply an alternating current thereto, said current being effective to create an alternating electromagnetic field about said conductors, the spacing between said conductors periodically varying at substantially equally spaced intervals to thereby vary the intensity of said electromagnet field about said conductor, the length of said intervals being such that a vehicle traveling along said path intercepts said intervals at a repetition rate much less than said frequency range.

2. A signal source for controlling a vehicle traveling a predetermined path, said source comprising at least a pair of electrical conductors that are arranged to define said path, said conductors being normally equally spaced from each other but periodically crossed at substantially equally spaced intervals, a source of alternating current of a variable frequency in a predetermined frequency range connected to the input ends of said conductors to supply an alternating current thereto, said current being effective to create an alternating electromagnetic field about said conductors that has reversed polarities on opposite sides of said crossings, the length of said intervals being such that a vehicle traveling along said path intercepts said intervals at a repetition rate much less than said frequency range.

3. A signal source for controlling a vehicle traveling a predetermined path, said source comprising a pair of electrical conductors spaced from each other and arranged to define said path, said conductors including portions that are equally spaced from each other by a predetermined amount, said portions being separated from each other by other portions that are spaced from each other by a substantially less amount, a source of alternating current of a variable frequency in a predetermined frequency range, the source being connected to the input ends of said conductors to supply an alternating current thereto, said current being effective to create an alternating electromagnetic field about said conductors that varies in intensity between said portions.

4. A signal source for controlling a vehicle traveling a predetermined path, said source comprising at least a pair of electrical conductors that are arranged to define said path, said conductors being normally spaced from each other but periodically crossed at substantially equally spaced intervals to form a series of loops, variable frequency current means interconnected with said conductors for supplying a current thereto that creates an alternating electromagnetic field of a frequency variable within a given range, said field including zones of reversed polarities corresponding to the spacing of said loops, said spacing being such that a vehicle traveling along said path at conventional speeds intercepts said zones at a repetition rate much less than the frequencies in said range.

5. In a device for controlling the speed of a vehicle traveling along a path defined by an alternating electromagnetic field radiating therefrom at a predetermined command frequency, the intensity of said field varying periodically with the distance along said path, the combination of a pickup mounted on said vehicle for sensing the flux in said field as said vehicle travels along said path and developing a voltage of said command frequency modulated at a frequency corresponding to the rate at which said pickup passes through the variations in intensity of said field, means for regulating the speed of said vehicle so as to cause said modulating frequency to correspond to said predetermined command frequency.

6. In a device for controlling the speed of a vehicle traveling a path defined by an alternating electromagnetic field radiating therefrom at a predetermined command frequency, said field having a flux density which varies periodically with the distance along said path, the combination of pickup means mounted on said vehicle for sensing the flux in said field as said vehicle travels along said path, said pickup means having a command speed voltage induced therein that has a frequency corresponding to the frequency of said field and an actual speed voltage that is modulated at a frequency corresponding to the rate at which said pickup means pass through the variations in intensity of said field, means interconnected with said pickup means and the vehicle throttle means so as to be responsive to said modulating frequency and said field frequency for maintaining the vehicle at a speed where said frequencies will be in some predetermined proportion.

7. Means for controlling the speed of a vehicle traveling a predetermined path, said means comprising guidance conductors arranged to define said path and having flowing therein an alternating current of a predetermined command frequency, the conductors being arranged so as to radiate an electromagnetic field in which the flux density varies periodically along said path, a pickup on said vehicle adapted to be disposed in said field and have a voltage induced therein, said voltage comprising a signal of said command frequency modulated at a frequency corresponding to the rate at which said pickup passes through said fluctuations in flux density, means connected to receive said voltage and responsive to the signal of said command frequency and to the frequency of said modulations, said last means being operatively interconnected with the vehicle throttle control so as to cause said modulated frequency to correspond to said predetermined command frequency thereby maintaining the speed of said vehicle at a predetermined amount.

8. Means for controlling the speed of a vehicle traveling over a predetermined path, said means comprising electrical conductors arranged to define said path by radiating an electromagnetic field having zones of contrasting flux density and a speed signal having a command frequency, pickup means carried by said vehicles to have a voltage induced therein comprising a signal of said command frequency modulated by a frequency corresponding to the rate at which said pickup means pass through said zones, vehicle throttle means connected to receive said voltage and adapted to be responsive to the frequency of said command signal and said modulating frequency for adjusting the speed of said vehicle to maintain said frequencies in some predetermined proportions.

9. Means for controlling the speed of a vehicle traveling over a predetermined path, said means comprising electrical conductors arranged to define said path and to carry an alternating current to form an alternating electromagnetic field, said field including zones of contrasting flux density and a speed signal having a command frequency, pickup means carried by said vehicle so as to be disposed in said field and have a voltage induced therein of said command frequency modulated by a frequency corresponding to the rate at which said pickup means pass through said zones, throttle means effective to control the speed of said vehicle interconnected with said pickup means to receive said voltage, said throttle means being responsive to said command frequency and said modulating frequency and being adapted to maintain the speed of said vehicle so that said modulating and command frequencies are in some predetermined proportions.

10. In an automatic control system for a throttle controlled vehicle having a steering system for controlling the direction of travel of the vehicle, the combination of a conductor defining a vehicle path, a source of alternating current of variable frequency connected to the input of the conductor, the frequency of the source determining a command frequency, the conductor being arranged so as to radiate a magnetic field having a flux density that varies periodically with the distance along the path, a pickup on the vehicle for sensing the flux in the magnetic field surrounding the conductor, the pickup including a pair of inductive coils normally positioned so as to straddle the conductor as the vehicle travels along the path, the inductive coils developing a voltage indicative of the distance of the coils from the conductor, a steering control system on the vehicle adapted for connection with the steering system, the steering control system being interconnected with the pickup and responsive to the voltage developed therein to control the steering system thereby maintaining the vehicle substantially constantly aligned with the conductor, such that the inductive coils are maintained in the normal position relative to the conductor, the voltage developed in said coils including a signal of said command frequency modulated at a frequency corresponding to the rate at which the pickup passes through the variations in flux density, and means connected to receive said voltage and adapted to be responsive to the command frequency and to the frequency of the modulations, said last means being operatively interconnected with the vehicle throttle so as to cause the modulated frequency to correspond to the predetermined command frequency thereby maintaining a predetermined vehicle speed.

11. In an automatic control system for a throttle controlled vehicle having a steering system for controlling the direction of vehicle travel, the combination of an electrical conductor defining a vehicle path, a source of alternating current of variable frequency connected to the input of the conductor, the frequency of the source determining a command frequency, the conductor being arranged so as to radiate an alternating magnetic field of an intensity that varies periodically with the distance along the path, a pickup carried by the vehicle for sensing the flux in the field, the pickup including a pair of inductive coils normally disposed on opposite sides of the conductor, the coils being interconnected with each other whereby the voltages induced therein will be opposed and the total voltage induced across both of the coils will be substantially zero when the pickup is centered relative to the conductor, a steering control system adapted for connection with the steering system, the steering control system being interconnected with the coils and responsive to the total voltage induced therein to control the steering system thereby maintaining the pickup substantially centered relative to the conductor, the voltages induced in the coils including a command speed voltage of a frequency corresponding to the command frequency and an actual speed voltage modulated at a frequency corresponding to the rate at which the pickup passes through the variations in the intensity of the magnetic field, and means interconnected with the pickup and the vehicle throttle so as to be responsive to the modulated frequency and the command frequency for maintaining the vehicle at a speed where the frequencies will be in some predetermined proportion.

12. In a device for controlling the speed of a vehicle, the combination of a pair of electrical conductors arranged to define a predetermined path for the vehicle, the conductors being normally spaced from each other but periodically crossed at substantially equally spaced intervals to form a series of loops, an alternating current source interconnected with the conductors for supplying a current thereto at a predetermined command frequency so as to create an alternating magnetic field, the field including zones of differing intensities corresponding to the loops, a pickup mounted on the vehicle for sensing the flux in the field as the vehicle travels along the path and developing a voltage of said command frequency modulated at a frequency corresponding to the rate at which the pickup passes through said zones, and means for regulating the speed of the vehicle so as to cause the modulated frequency to correspond to the predetermined command frequency thereby maintaining a predetermined speed of the vehicle.

13. In a device for controlling the speed of a throttle controlled vehicle, the combination of a pair of electrical conductors spaced from each other and arranged to define a path of travel for the vehicle, the conductors having portions equally spaced from each other a predetermined amount, the portions being separated from each other by other portions that are spaced from each other by a substantially less amount, a source of alternating current connected to the input ends of the conductor so as to supply an alternating current thereto of a predetermined frequency, the current being effective to produce magnetic fields radiating from the conductors thereby establishing alternate zones of different flux density, a pickup carried by the vehicle, the pickup including a pair of inductive coils longitudinally spaced from each other and positioned relative to the alternate zones along the conductor so as to develop a substantially constant total voltage having a command frequency corresponding to the predetermined frequency, one of the inductive coils having a voltage induced therein of a frequency corresponding to the rate at which the pickup passes through the zones of different density, and means interconnected with the pickup and the vehicle throttle so as to be responsive both to the modulated frequency and the command frequency for maintaining the vehicle at a speed in which the frequencies are in some predetermined proportion.

14. A vehicle speed control system comprising a conductor extending along the path of the vehicle and crossing said path at regularly spaced intervals, a source of alternating current having a frequency in a given range, said source being connected to said conductor whereby an alternating field is established along said path, said field having regularly spaced zones of increased intensity at intervals determined by the crossing of said conductor, vehicle-mounted pickup means responsive to said field and adapted to produce an output in accordance with the amplitude thereof at the pickup position, a first discriminator tuned to said given range and adapted to produce a first voltage related to the frequency of said source, a second discriminator tuned to the frequency range of the rate of interception of said zones by said vehicle and adapted to produce a second voltage related to said rate, and means connected to receive said first and second voltages and adapted to control vehicle speed in accordance with the relative magnitudes of said first and second voltages.

15. A vehicle speed control system comprising a conductor extending along the path of the vehicle and crossing said path at regularly spaced intervals, a source of alternating current of relatively high frequency connected to said conductor whereby an alternating field is established along said paths, said field having regularly spaced zones of increased intensity determined by the crossing of said conductor, the spacing of said intervals being such that the rate of interception of said zones by a vehicle traveling along said path at customary speeds will be much less than said high frequency, vehicle-mounted pickup means responsive to said field and adapted to produce an output having a first component corresponding to the frequency of said source, and a second component corresponding to the interception of said zones, a first demodulator connected to said pickup means to receive said output and adapted to produce a first voltage related to said first component, a second demodulator connected to said pickup means to receive said output and adapted to produce a second voltage related to said second component, and vehicle throttle control means connected to said first and second demodulators and adapted to control the vehicle speed in accordance with the relative amplitudes of said first and second voltages.

References Cited in the file of this patent

UNITED STATES PATENTS

| | | |
|---|---|---|
| 2,317,400 | Paulus et al. | Apr. 27, 1943 |
| 2,493,755 | Ferrill | Jan. 10, 1950 |
| 2,576,424 | Sunstein | Nov. 27, 1951 |
| 2,661,070 | Ferrill | Dec. 1, 1953 |
| 2,803,743 | Ballerait | Aug. 20, 1957 |